(12) United States Patent
Zhang et al.

(10) Patent No.: US 8,703,355 B2
(45) Date of Patent: Apr. 22, 2014

(54) CATALYTIC ELECTRODE WITH GRADIENT POROSITY AND CATALYST DENSITY FOR FUEL CELLS

(75) Inventors: Chun Zhang, Tallahassee, FL (US); Wei Zhu, Tallahassee, FL (US); Jian-ping Zheng, Tallahassee, FL (US); Zhiyong Liang, Tallahassee, FL (US); Ben Wang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 707 days.

(21) Appl. No.: 12/839,124

(22) Filed: Jul. 19, 2010

(65) Prior Publication Data

US 2011/0008705 A1 Jan. 13, 2011

Related U.S. Application Data

(63) Continuation-in-part of application No. 12/505,070, filed on Jul. 17, 2009, now Pat. No. 8,415,012, and a continuation-in-part of application No. 11/670,687, filed on Feb. 2, 2007, now Pat. No. 7,955,535.

(60) Provisional application No. 61/320,639, filed on Apr. 2, 2010, provisional application No. 61/081,851, filed on Jul. 18, 2008, provisional application No. 60/764,504, filed on Feb. 2, 2006.

(51) Int. Cl.
*H01M 8/10* (2006.01)
*H01M 4/88* (2006.01)

(52) U.S. Cl.
USPC .......... 429/483; 429/480; 977/742; 977/948; 502/101

(58) Field of Classification Search
None
See application file for complete search history.

(56) References Cited

U.S. PATENT DOCUMENTS

| | | | |
|---|---|---|---|
| 6,036,857 A | 3/2000 | Chen et al. |
| 6,287,717 B1 | 9/2001 | Cavalca |
| 6,683,783 B1 | 1/2004 | Smalley et al. |
| 7,105,596 B2 | 9/2006 | Smalley et al. |
| 7,459,121 B2 | 12/2008 | Liang et al. |
| 7,862,766 B2 | 1/2011 | Liang et al. |
| 2002/0150524 A1 | 10/2002 | Smalley et al. |
| 2003/0118907 A1 | 6/2003 | Shiraishi |

(Continued)

OTHER PUBLICATIONS

Ku, Chung-Lin, "Nanotube Buckypaper Electrodes for PEM Fuel Cell Applications" Electronic Theses, Treatises, and Dissertations. Paper 2959. Nov. 6, 2007.*

(Continued)

*Primary Examiner* — Milton I Cano
*Assistant Examiner* — Sarah A Slifka
(74) *Attorney, Agent, or Firm* — Novak Druce Connolly Bove + Quigg LLP; Gregory A. Nelson

(57) ABSTRACT

A membrane electrode assembly (MEA) for a fuel cell comprising a gradient catalyst structure and a method of making the same. The gradient catalyst structure can include a plurality of catalyst nanoparticles, e.g., platinum, disposed on layered buckypaper. The layered buckypaper can include at least a first layer and a second layer and the first layer can have a lower porosity compared to the second layer. The gradient catalyst structure can include single-wall nanotubes, carbon nanofibers, or both in the first layer of the layered buckypaper and can include carbon nanofibers in the second layer of the layered buckypaper. The MEA can have a catalyst utilization efficiency of at least 0.35 $g_{cat}$/kW or less.

12 Claims, 12 Drawing Sheets

(56) References Cited

U.S. PATENT DOCUMENTS

| | | |
|---|---|---|
| 2004/0197638 A1 | 10/2004 | McElrath et al. |
| 2005/0154116 A1 | 7/2005 | Nagy et al. |
| 2005/0239948 A1 | 10/2005 | Haik et al. |
| 2006/0017191 A1 | 1/2006 | Liang et al. |
| 2006/0166003 A1 | 7/2006 | Khabashesku et al. |
| 2006/0207931 A1 | 9/2006 | Liang et al. |
| 2006/0247364 A1 | 11/2006 | Murray et al. |
| 2007/0176319 A1 | 8/2007 | Thostenson et al. |
| 2008/0020261 A1 | 1/2008 | Hendricks |
| 2008/0057265 A1 | 3/2008 | Liang et al. |
| 2008/0115875 A1 | 5/2008 | Jeng et al. |
| 2008/0280115 A1 | 11/2008 | Liang et al. |
| 2009/0053577 A1 | 2/2009 | Aotani |
| 2011/0008705 A1 | 1/2011 | Zheng |

OTHER PUBLICATIONS

Ku, "Nanotube buckypaper electrode for PEM fuel cell applications," MS Thesis, Florida State University (2007) Paper 2959: 1-84.
Office Action issued on Jun. 13, 2013 in KR Application No. 2011-7016087. (9 pages).
Supplementary European Search Report mailed on May 7, 2013 in EP Application No. 10 80 0665. (6 pages).
U.S. Appl. No. 11/459,171, filed Jul. 21, 2006, Wang et al.
Ajayan et al., "Aligned carbon nanotube arrays formed by cutting a polymer resin-nanotube composite," Science (1994) 265:1212-1214.
Ajayan et al., "Single-walled carbon nanotube-polymer composites: Strength and weakness," Advanced Materials (2000) 12:750-753.
Andrews et al., "Nanotube composite carbon fibers," Applied Physics Letters (1999) 75(9): 1329-1331.
Athalin, "A correlated method for quantifying mixed and dispersed carbon nanotubes: Analysis of the Raman band intensities and evidence of wavenumber shift," Journal of Raman Spectroscopy (2005) 36:400-408.
Bordjiba et al., "Binderless carbon nanotube/carbon fibre composites for electrochemical micropower sources," Nanotechnology (2007) 18:1-5. 035202.
Chauvet et al., "Magnetic anisotropies of aligned carbon nanotubes," The American Physical Society (1995) 52(10): 6963-6966.
Chen et al., "Electrochemical synthesis of polypyrole/carbon nanotube nanoscale composites using well-aligned carbon nanotube arrays," Applied Physics A (2001).
Cheng et al., "Power densities using different cathode catalysts (Pt and CoTMPP) and polymer binders (Nafion and PTFE) in single chamber microbial fuel cells," Environ. Sci. Technol. (2006) 40(1) 364-369.
Cho et al., "Carbon nanotube synthesis using a magnetic field via thermal chemical vapor deposition," Journal of Crystal Growth (2002) 243:224-229.
Cooper et al., "Distribution and alignment of carbon nanotubes and nanofibrils in a polymer matrix," Composites Science and Technology (2002) 62: 1105-1112.
Dai, "Carbon nanotubes opportunities and challenges," Surface Science (2002) 500:218-241.
de Heer et al., "Aligned carbon nanotube films: Production and optical and electronic properties," Science (1995) 268:845-847.
Dresselhaus et al., "Graphite fiber and filament," M. Cardon, Ed., (1988) 12-34.
Ebbesen et al., "Electrical conductivity of individual carbon nanotubes," Nature (1996) 382:54-56.
Endo et al., "Buckypaper from coaxial nanotubes," Nature (2005) 433(3): 476.
Fan et al., "Self-oriented regular arrays of carbon nanotubes and their field emission properties," Science (1999) 283:512-514.
Fujiwara et al., "Magnetic orientation and magnetic properties of a single carbon nanotube," The Journal of Physical Chemistry, 105(18):4383-4386.
Garg et al., "Effect of chemical functionalization on the mechanical propertied of carbon nanotubes," Chemical Physics Letters (1998) 2954(4): 273-278. Abstract.

Gasteiger et al., "Activity benchmarks and requirements for Pt, Pt-alloy, and non-Pt oxygen reduction catalysts for PEMFCs," Applied Catalysis B: Environmental (2004) 56:935.
Gou et al., "Development of nanotube bucky paper/epoxy nanocomposites, Proceedings of the TEXCOMP-6," International Symposium on Textile Composites (2002) 1-5.
Gou et al., "Experimental design and optimization of dispersion process for single-walled carbon nanotube bucky paper," International Journal of nanoscience (2004) 3(3):293-307.
Gou et al., "Process analysis and optimization of SWNT bucky paper reinforce epoxy composites," Proceedings of the 48th International Society for Advancement of Material Process Engineering (SAMPE) Symposium and Exhibition, Long Beach, CA (2003): 1-12.
Haggenmueller et al., "Aligned single-walled carbon nanotubes in composites by melt processing methods," Chemical Physics Letters (2000) 330:219-225.
Hertel et al., "Deformation of carbon nanotubes by surface van der Waals Forces," Physical Review B. (1998) 58:13870-13873.
Holloway et al., "Texture development due to preferential gain growth of Ho-Ba-Cu-0 in 1.6-T Magnetic Field," J. Mat. Res. (1993) 8:727-733.
Hou and Reneker, "Carbon nanotubes on carbon nanofibers: A novel structure based on electrospun polymer nanofibers," Advanced Materials (2004) 16(1):69-73.
Iijima, "Helical microtubules of graphitic carbon," Nature (1991) 354:56-58.
International Search Report and Written Opinion dated Jan. 28, 2011 for International Application No. PCT/US2010/042451, International filed Jul. 19, 2010. (6 pages).
Kimura et al., "Polymer composites of carbon nanotubes aligned by a magnetic field," Advanced Materials (2002) 14(19):1380-1383.
Knez et al., "Electrochemical modification of individual nano-objects," Journal of Electroanalytical Chemistry (2002) 522:70-74.
Konkanand et al., "Highly dispersed Pt catalysts on single-walled carbon nanotubes and their role in methanol oxidation," J Phys Chem B (2006) 110(33):16185-16188.
Kumar et al., "Fibers from polypropylene/nano carbon fiber composites," Polymer (2002) 43: 1701-1703.
Kyotani et al., "Preparation of ultrafine carbon tubes in nanochannels of an anodic aluminum oxide film," Chem. Mater. (1996) 8:2109-2113.
Li, et al., "Carbon nanotube film by filtration as cathode catalyst support for proton-exchange membrane fuel cell," Langmuir (2005) 21:9386-9389.
Li et al., "Large-scale synthesis of aligned carbon nanotubes," Science (1996) 274:1701-1703.
Liang et al., "Molecular dynamic simulation and experimental investigation of filing chopped SWNTS with resin matrix molecules to enhance interfacial bonding and loading transfer in nanocomposites," SAMPE (2004), Long Beach, CA: 1-8.
Lourie et al., "Evaluation of Young's Modulus of carbon nanotubes by micro-Raman spectroscopy," Journal of Materials Research (1998) 13(9):2418-2422.
Michel et al., "High-performance nanostructured membrane electrode assemblies for fuel cells made by layer-by-layer assembly of carbon noncolloids," Advanced Materials (2007) 19: 3859-3864.
Ni et al., "Chemical functionalization of carbon nanotubes through energetic radical collisions," Physical Review B. (2000) 61:R16343-R16346.
Odom et al., "Atomic structure and electronic properties of single-walled carbon nanotubes," Nature (1998) 391:62-64.
Qian et al., "Load transfer and deformation mechanisms in carbon nanotube-polystyrene composites," Applied Physics Letters (2000) 76(20):2868-2870.
Ramesh et al., "SWNT-MWNT hybrid architecture for proton exchange membrane fuel cell cathodes," J Phys. Chem. C (2008) 112:9089-9094.
Saha et al., "High loading and monodispersed Pt nanoparticles on multiwalled carbon nanotubes for high performance proton exchange membrane fuel cells," Available online Nov. 21, 2007. J Power Sources (2008) 177:314-322.
Saito et al., "Physical properties of carbon nanotubes," Imperial College Press (1998), Chapter 11, pp. 207-209 and 221-224.

(56) References Cited

OTHER PUBLICATIONS

Smith et al., "Structural anisotropy of magnetically aligned single wall carbon nanotube films," Applied Physics Letters (2000) 77(5):663-665.

Stephan, et al., "Characterization of singlewalled carbon nanotubes-PMMA composites," Synthetic Metals (2000) 108(2): 139-149. Abstract.

Tang et al., "Carbon nanotube free-standing membrane of Pt/SWNTs as catalyst layer in hydrogen fuel cells," Aust. J. Chem (2007) 60:528-532.

Thostenson et al., "Advances in the science and technology of carbon nanotubes and their composites: A review," Composites Science and Technology (2001) 61: 1899-1912.

Thostenson et al., "Nanocomposites in context," Composites Science and Technology (2004) 65: 491-516.

Treacy et al., "Exceptionally high Young's Modulus observed for individual carbon nanotubes," Nature (1996) 381: 678-680.

Velasco-Santos et al., "Chemical functionalization of carbon nanotubes through an organosilane," Nanotechnology (2002) 13:495-498.

Velasco-Santos et al., "Chemical functionalization of carbon nanotubes through an organosilane," Nanotechnology (2002) 13:495-498. Abstract.

Vohrer, "Carbon nanotube sheets for the use as artificial muscles," Carbon (2004) 42:1159-1164.

Wang et al., "Growth and characterization of buckybundles," Applied Physics Letters (1993) 62(16): 1881-1883.

Wang et al., "Fabrication and characterization of in-plane aligned nanotube composites with magnetically aligned carbon nanotube bucky papers," Proc. 14$^{th}$ Int. Conf. on Composite Materials (ICCM-14) (2003), 1, San Diego, CA: 1-7.

Wikipedia, "Carbon Nanotube" (Jan. 9, 2006): 1-7.

Wood et al., "Orientation of carbon nanotubes in polymers and its detection by Raman Spectroscopy," Composites: Part A (2001) 32:391-399.

Wu et al., "Deposition of nanotube composites using matrix-assisted pulsed laser evaporation," Materials Research Society Symposium (2000) 617:J2.3.1-6.

Zhang et al., "Electrostatic layer-by-layer assembled carbon nanotube multilayer film and its electrocatalytic activity for O2 reduction," Langmuir (2004) 20:8781-8785.

\* cited by examiner

CATALYTIC ELECTRODE WITH GRADIENT POROSITY AND CATALYST DENSITY FOR FUEL CELLS

CROSS REFERENCE TO RELATED APPLICATIONS

This application claims priority to U.S. Provisional Application No. 61/320,639, entitled "Catalytic Electrode with Gradient Porosity and Catalyst Density for Fuel Cells," filed Apr. 2, 2010, and is a Continuation-in-Part of U.S. patent application Ser. No. 12/505,070, now U.S. Pat. No. 8,415,012, entitled "Carbon Nanotube and Nanofiber Film-Based Membrane Electrode Assemblies," filed Jul. 17, 2009, which claims priority to U.S. Patent Application No. 61/081,851, entitled "Carbon Nanotube and Nanofiber Film-Based Membrane Electrode Assemblies," filed Jul. 18, 2008, and is a continuation-in-part of U.S. patent application Ser. No. 11/670,687, now U.S. Pat. No. 7,955,535, filed Feb. 2, 2007, which claims priority to U.S. Patent Application No. 60/764,504, filed Feb. 2, 2006, the entirety of each is incorporated herein by reference.

STATEMENT REGARDING FEDERALLY SPONSORED RESEARCH OR DEVELOPMENT

The United States Government has rights in this invention pursuant to contract no. 023106 between the U.S. Army Communications-Electronics Research, Development, and Engineering Center and Florida State University.

FIELD OF THE INVENTION

The present invention is related to the field of membrane electrode assemblies for proton exchange membrane fuel cells.

BACKGROUND OF THE INVENTION

Fuel cells are regarded by many as a promising source of power for a wide array of devices, including vehicles, as well as a host of other portable and stationary applications. Fuel cells are capable of providing high energy efficiency and relatively rapid start-up. Moreover, fuel cells are capable of generating power without generating the types of environmental pollution that characterize many other sources of power. Thus, fuel cells can be a key to meeting critical energy needs while also mitigating environmental pollution by substituting for conventional power sources.

Notwithstanding the advantages afforded by increased utilization of fuel cells, their wide-spread commercialization is likely to hinge on whether and the extent to which the cost per unit power associated with fuel cells can be reduced including the precious metal cost. For transportation applications, U.S. Department of Energy (DOE) has set a 2015 technical target for the electrocatalysts which is generating a rated power of 1 W/cm$^2$ with a total Pt loading of 0.2 mg/cm$^2$ resulting in a Pt utilization of 0.2 g$_{Pt}$/kg. U.S. Dept. of Energy, *Hydrogen, Fuel Cell & Infrastructure Technologies Program Multi-Year Research, Development and Demonstration Plan* (2007). This level of utilization will have substantial benefits, including a substantial cost reduction due to reduced amounts of platinum (Pt) required for the same or improved fuel cell output. Indeed, a particularly promising avenue for commercialization is to improve Pt utilization while also optimizing electrode structure so as to achieve a high Pt specific power density.

One obstacle to achieving this aim, however, is the fact that conventional catalyst supporting materials, such as carbon black Vulcan XC-72R, have numerous micropores in which Pt nanoparticles can become trapped. This typically results in a failure in establishing the three-phase boundary (TPB) among gas, electrolytes, and the electrocatalyst of a fuel cell. The corresponding fraction of Pt is therefore not utilized since the electrochemical reactions cannot occur at these sites, thus causing a reduction in the level of Pt utilization. Moreover, carbon black can be corroded under the severe conditions inherent in the cathode of the fuel cell, resulting in low cell stability and reduced service life.

More recently, carbon nanotubes and nanofibers have been examined as possible catalyst supports in proton exchange membrane fuel cells (PEMFCs) because carbon nanomaterials typically exhibit high conductivity and large specific surface areas. Additionally, such carbon nanomaterials possess relatively low microporosity and typically exhibit excellent resistance to electrochemical corrosion.

A conventional processes for fabricating carbon nanotube-based and carbon nanofiber-based catalyst layers for use in a PEMFC is to disperse carbon nanotubes (CNTs) or carbon nanofibers (CNFs) in a binder, such as Teflon or Nafion, to form a slurry that is then used to coat the gas diffusion layer. A significant problem inherent in the conventional process, however, is that the addition of the binder during the fabrication stage tends to isolate carbon nanotubes in the electrocatalyst layer, leading to poor electron transport and degradation or elimination of the Pt active surface.

SUMMARY OF THE INVENTION

In view of the foregoing background, it is therefore a feature of the present invention to provide a carbon materials based membrane electrode assembly (MEA) for a fuel cell that overcomes the limitations discussed above. According to one aspect of the invention, the MEA comprises a porous layered buckypaper film with catalyst nanoparticles disposed on or near one of buckypaper surfaces for a tailored gradient structure. As used herein, the term "buckypaper" is used to refer to a film-like, stable composite comprising a web of single-wall carbon nanotubes (SWNT), multi-wall carbon nanotubes (MWNT), carbon nanofibers (CNF), or a combination thereof. The buckypaper-nanoparticle catalyst composite is applied as a catalyst layer of the MEA.

A particular feature of the MEA, according to the invention, is the gradient pore size distribution and catalyst nanoparticle distribution based on layered buckypaper film (LBP) with at least a first layer and a second layer. The LBP can be fabricated with carbon nanotubes, nanofibers, or a mixture thereof, with little or no binder.

The microstructure of the LBP can be tailored by adjusting the starting materials and nanoparticle dispersion so as to achieve a desired porosity, pore size, surface area, and electrical conductivity for use as the catalyst layer of the MEA. The catalyst nanoparticles are preferably deposited directly at the most efficient sites of the LBP to thereby maximize the three-phase reaction coefficient. The MEA so fabricated can have a higher catalyst utilization rate at the electrodes, can provide higher power output, and can have enhanced oxidation resistance, and a longer service life, as compared to conventionally-fabricated fuel cells.

In one embodiment, the MEA disclosed herein can include a proton exchange membrane and a gradient catalyst structure. The gradient catalyst structure can include a plurality of catalyst nanoparticles disposed on layered buckypaper, which can include at least a first layer and a second layer. The catalyst structure can include a gradient structure such that the first layer of the layered buckypaper has a lower porosity compared to the second layer of the layered buckypaper. The MEA can have a catalyst utilization efficiency of the plurality of catalyst nanoparticles of 0.35 $g_{cat}$/kW or less.

The first layer of the layered buckypaper can include a mixture of single-walled carbon nanotubes (SWNTs) and carbon nanofibers (CNFs), and the second layer of the layered buckypaper can include CNFs.

The plurality of catalyst nanoparticles can be deposited on the layered buckypaper after the layered buckypaper is formed. The plurality of catalyst nanoparticles can include platinum (Pt). The catalyst layer can also include a perfluorinated sulfonic acid resin, deposited on the layered buckypaper after the layered buckypaper is formed.

These and other embodiments are described in more detail below.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

FIG. 2(a) is a scanning electron microscopy (SEM) image of a cross-sectional view of an exemplary layered buckypaper; FIG. 2(b) is an energy-dispersive X-ray spectroscopy (EDS) analysis of the layered buckypaper of FIG. 2(a); FIG. 2(c) is a surface image of the first layer of the layered buckypaper of FIG. 2(a); and FIG. 2(d) is a surface image of the second layer of the layered buckypaper of FIG. 2(a).

DETAILED DESCRIPTION

A newly-designed membrane electrode assembly (MEA) for a fuel cell with a gradient catalyst structure and a method for fabricating the same are disclosed. The membrane electrode assembly utilizes layered carbon nanomaterial buckypaper with catalyst nanoparticles. The layered buckypaper can be fabricated with gradient pore size distribution, gradient porosity, gradient electrolyte concentration, and/or gradient catalyst nanoparticle distribution.

As used herein, "nanoparticle" refers to a particle having a major axis length of less than 300 nm. The major axis length can be less than 200 nm, or less than 100 nm. The catalyst nanoparticles described herein can have a major axis length ranging from 0.1 nm to 100 nm, or 0.1 nm to 50 nm, or 1 nm to 25 nm, or 1 nm to 10 nm.

Figure 1:
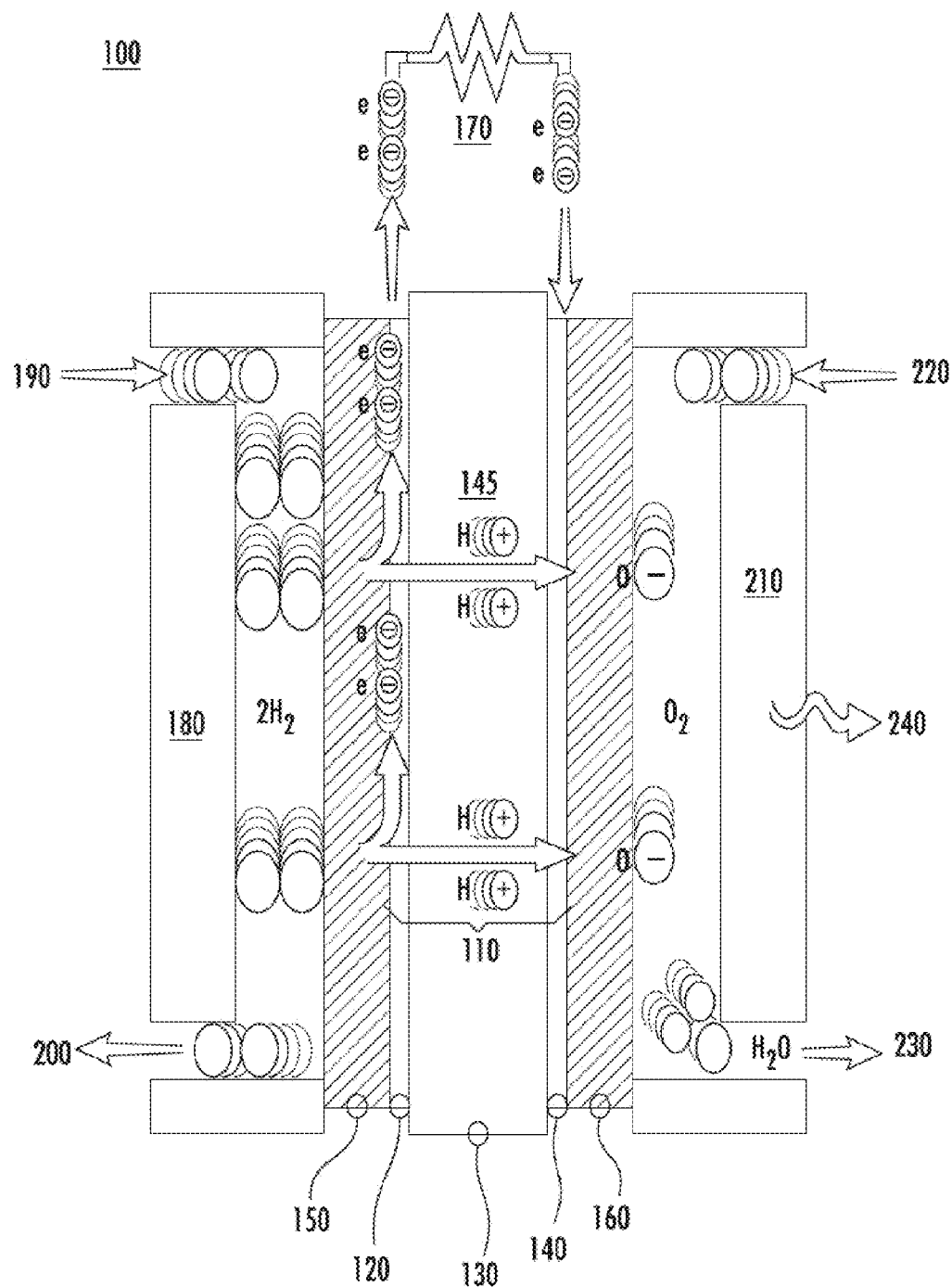
FIG. 1 is a schematic of an exemplary proton exchange membrane fuel cell (PEMFC), including a membrane electrode assembly (MEA).

FIG. 1 shows an exemplary proton exchange membrane fuel cell (PEMFC) 100 for use in connection with the membrane electrode assembly disclosed herein. The MEA 110 can include an anode catalyst layer 120, a proton exchange membrane 130 and a cathode catalyst layer 140. The proton exchange membrane 130 serves as an electrical insulator separating the anode catalyst layer 120 from the cathode catalyst layer 140, while also being permeable to protons 145. In addition, the MEA 110 can include an anode gas diffusion layer 150 and a cathode gas diffusion layer 160. The anode catalyst layer 120 and cathode catalyst layer 140 can be electrically connected to an electromechanical device 170 enabling electrons to flow from the anode catalyst layer 120 through the electromechanical device 170 to the cathode catalyst layer 140. Exemplary electrochemical devices 170 include, but are not limited to, motors, electrical outlets, and energy storage devices, such as batteries and capacitors.

In one example, the anode side 180 of the PEMFC 100 is designed to bring a fuel gas 190, such as hydrogen ($H_2$), into contact with the anode catalyst layer 120. The used fuel 200 is then exhausted from an outlet of the anode side 180. The cathode side 210 of the PEMFC 100 is designed to bring an oxidant 220, such as oxygen ($O_2$) from air, into contact with the cathode catalyst layer 140. The oxidation of the oxygen on the cathode side 210 produces water and generates heat 240. The mixture of air and water 230 flows out of the cathode side 210, while the excess heat 240 can be removed using water, cooled air, or other heat exchange techniques. It will be understood that while an exemplary PEMFC has been disclosed, there are other designs for PEMFCs with which the MEA disclosed herein can be used.

As shown in FIG. 1, the anode catalyst layer 120 and cathode catalyst layer can be disposed on opposite sides of the proton exchange membrane 130. The anode catalyst layer 120 can be disposed between the anode gas diffusion layer 150 and the proton exchange membrane 130. The cathode catalyst layer 140 can be disposed between the cathode gas diffusion layer 160 and the proton exchange membrane 130. The anode catalyst layer 120 and anode gas diffusion layer 150 can be separate or integrally formed. The cathode catalyst layer 140 and cathode gas diffusion layer 160 can be separate or integrally formed.

The MBA catalyst structure can include catalyst nanoparticles (for example, Pt) and solid electrolytes, e.g., polymer, distributed within the cathode catalyst layer 140 and/or anode catalyst layer 120 near the respective interfaces with the proton exchange membrane 130 and/or on the external surface of catalyst agglomerates in order to enhance the active sites and reduce the proton transport resistance. In addition, the MEA can include small Pt/C agglomerates to facilitate reactants reaching active sites.

The membrane electrode assembly (MEA) disclosed herein can include a proton exchange membrane 130 and an electrode layer 120 and/or 140 that includes a gradient catalyst structure comprising layered buckypaper with a plurality of catalyst nanoparticles disposed thereon. The layered buckypaper can have at least a first layer and a second layer, in which the first layer has a lower porosity than the second layer. The MEA can have a catalyst utilization efficiency of at least 0.4 $g_{cat}$/kW or less, 0.35 $g_{cat}$/kW or less, 0.3 $g_{cat}$/kW or less, or 0.25 $g_{cat}$/kW or less, or 0.2 $g_{cat}$/kW or less. Relative to conventional MEAs, the MEA according to the design disclosed herein has an improved catalyst utilization efficiency at the electrodes, a higher power output, and better resistance to oxidation, as well as longer service life.

As used herein, the term "buckypaper" is used to refer to a film-like, stable composite comprising a web of single-wall carbon nanotubes (SWNT), multi-wall carbon nanotubes (MWNT), carbon nanofibers (CNF), or a combination thereof. In the embodiments disclosed herein, the buckypaper can be stabilized largely by entanglement of flexible single-wall nanotubes and/or small diameter multi-wall nanotubes around larger, more rigid nanofibers and/or the large diameter multi-wall nanotubes.

Layered buckypaper can include at least two layers which are comprised of different nanomaterials, different combinations of nanomaterials, or different dispersions of nanomaterials. Nanomaterials can include at least nanotubes or nanofibers.

As used herein, the terms "carbon nanotube" and the shorthand "nanotube" refer to carbon fullerene structures having a generally cylindrical shape and typically having a molecular weight ranging from about 840 to greater than 10 million Daltons. Carbon nanotubes are commercially available, for example, from Carbon Nanotechnologies, Inc. (Houston, Tex. USA), or can be made using techniques known in the art. Single-wall nanotubes can have a diameter of less than 5 nanometers and a length between 100-1000 nanometers. Multi-wall nanotubes are multi-walled structures and can have a diameter ranging from less than 10 nanometers to 100 nanometers and a length between 500 nanometers and 500 micrometers. Carbon nanofibers are cylindric nanostructures with graphene layers arranged as stacked cones, cups or plates and can have a diameter from 50 nanometers to 200 nanometers and a length from 30 to 100 micrometers.

As used herein, the term "small diameter MWNT" refers to multi-wall nanotubes having a diameter of 10 nm or less, and the term "large diameter MWNT" refers to multiwall nanotubes having a diameter of more than 10 nm. Small diameter MWNT can have a diameter of at least 0.1 nm.

As used herein, "porosity" is the ratio—represented as a percentage—of the volume of the pores or interstices of a material or layer to the total volume of the material or layer. The porosity of the first layer of the layered buckypaper can be at least 5%, 10%, 15%, 20%, 30% or 40% lower than the porosity of the second layer of the layered buckypaper. For example, the porosity of the first layer can be 75%, while the porosity of the second layer can be 80%, such that the porosity of the first layer is 5% lower than the porosity of the second layer. Exemplary methods of measuring porosity include mercury intrusion porosimetry, gas adsorption methods, optical methods, and direct methods.

The layered buckypaper microstructure can be tailored by adjusting the starting materials and nanomaterial dispersion to achieve a target porosity, pore size, surface area and electrical conductivity. For example, the gradient catalyst structure of the MEA can include layered buckypaper with at least a first layer and a second layer. The first layer can include a mixture of small-size and large-size nanomaterials, in which (i) the small-size nanomaterials can include single-walled carbon nanotubes, small diameter multi-wall nanotubes, or both, and (ii) the large-size nanomaterials can include carbon nanofibers, large diameter multi-wall nanotubes, or both. The second layer can include carbon nanofibers, large diameter multi-wall nanotubes, or both. In addition to the carbon nanofibers or large diameter multi-wall nanotubes or both, the second layer can also include single-walled nanotubes or large diameter multi-wall nanotubes or both.

Thus, the cathode catalyst layer 140, anode catalyst layer 120, or both can include a layered buckypaper, i.e., gradient catalyst structure. The first layer of the layered buckypaper can include a mixture of single-walled nanotubes and carbon nanofibers and the second layer can include carbon nanofibers. The percent porosity of the first layer can be at least 5 percentage points lower, at least 10 percentage points lower, at least 15 percentage points lower, or at least 20 percentage points lower than the percent porosity of the second layer. The percent porosity of the first layer can be no more than 40 percentage points lower, no more than 35 percentage points lower, or no more than 30 percentage points lower than the percent porosity of the second layer. For example, the porosity of the first layer can be 40% and the porosity of the second layer can be 80%, which means the porosity of the first layer is 40 percentage points lower than the second layer.

The catalyst nanoparticles can include platinum, iron, nitrogen, nickel, carbon, cobalt, copper, palladium, ruthenium, rhodium, and combinations thereof. The catalyst nanoparticles can be platinum or platinum(111) or $Pt_3Ni(111)$.

The catalyst nanoparticles can be distributed on the layered buckypaper such that a first weight percentage of the catalyst nanoparticles is disposed on the first layer and a second weight percentage of the catalyst nanoparticles is disposed on the second layer. The first and second weight percentages can be calculated by any suitable means. For example, the first weight percentage can be the weight of catalyst nanoparticles disposed on the first layer divided by the total weight of the first layer of the buckypaper. The first weight percentage of the catalyst nanoparticles can be at least 5 wt-%, 10 wt-%, 15 wt-%, 20 wt-%, 30 wt-% or 40 wt-% higher (by weight percentage) than the second weight percentage. This value can be measured using the following formula:

$$(\text{first wt-\%} - \text{second wt-\%})/(\text{first wt-\%} + \text{second wt-\%}) * 100\%$$

Thus, if the first weight percentage is 5 wt-% and the second weight percentage is 2.5 wt-%, the first weight percentage is 33.3 wt-% higher (100%*(5−2.5)/(5+2.5)) than the second weight percentage.

Figures 2A, 2B:
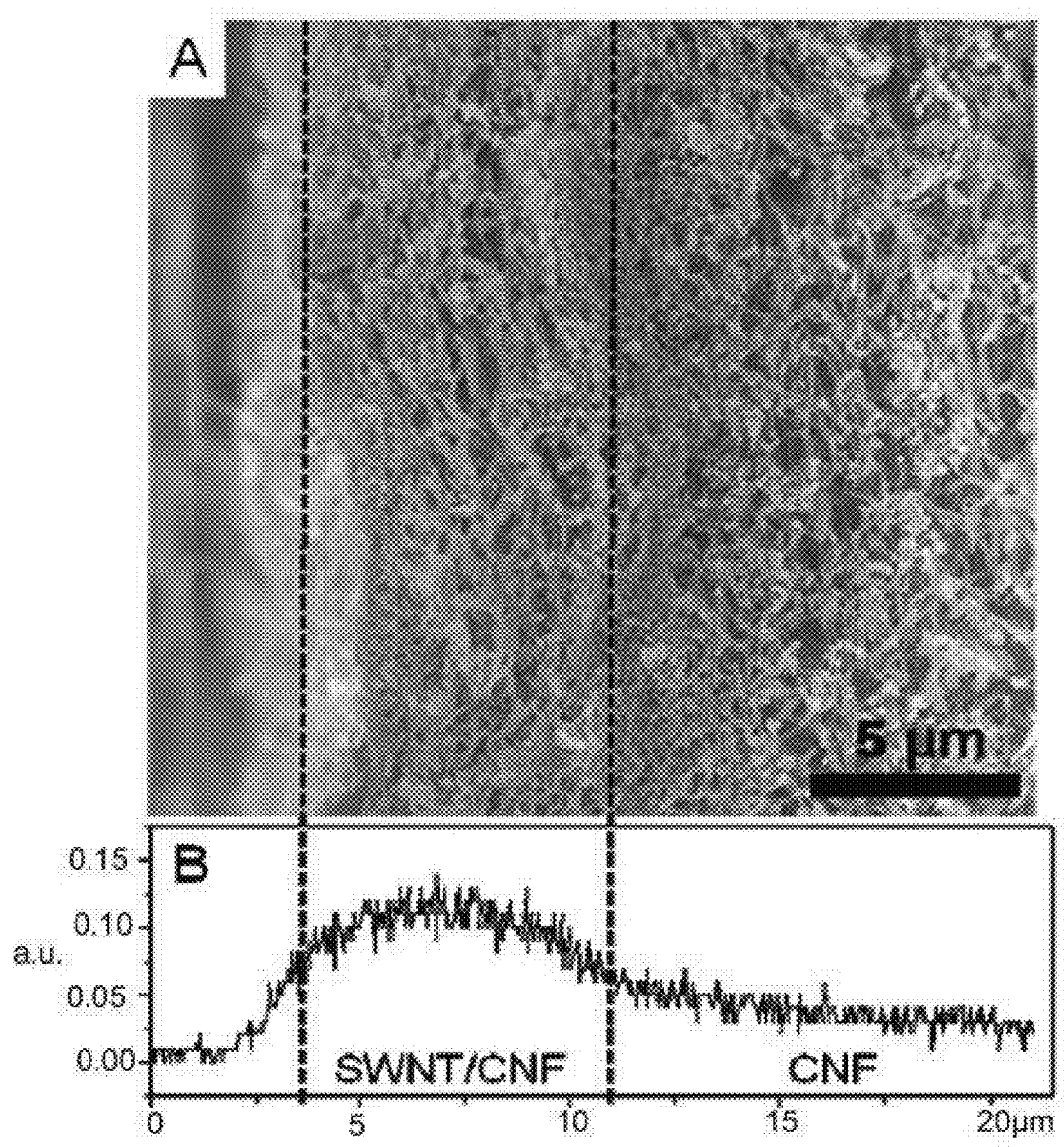
FIGS. 2(a)-(d) are images of an exemplary layered buckypaper and energy-dispersive X-ray data, where
Figures 2C, 2D:
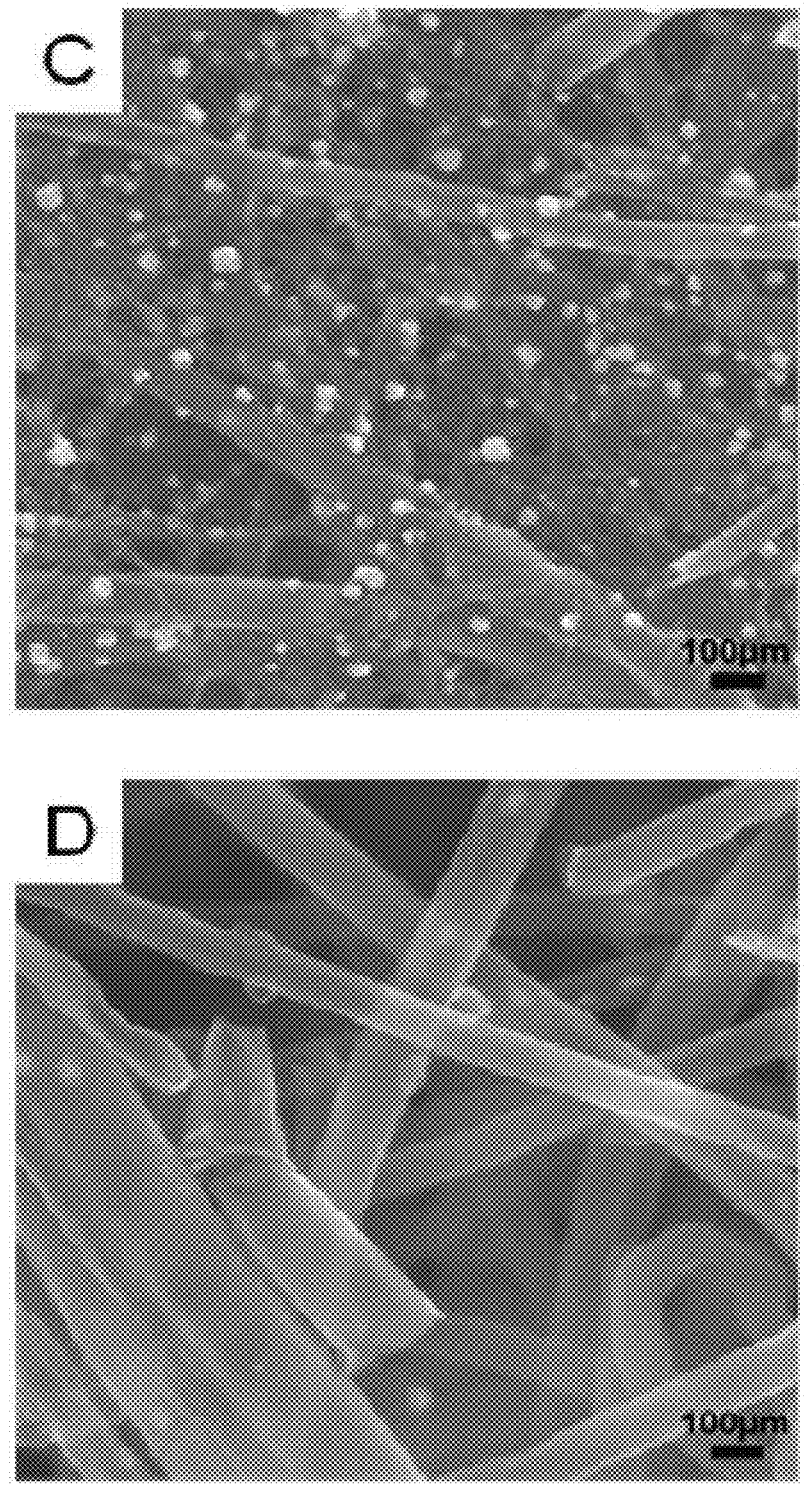

The MEA can include Pt as the plurality of catalyst nanoparticles disposed on the layered buckypaper (Pt/LBP) of the anode or cathode catalyst layers 120 and 140, respectively. FIG. 2 shows images of an exemplary gradient catalyst structure of Pt/LBP in which the first layer includes SWNTs and CNFs and the second layer includes only CNFs. FIG. 2(a) is a SEM image of the LBP, showing the thin first layer (~5 μm) on the left having a lower porosity and average pore size compared to the second layer on the right. FIG. 2(b) is an EDS analysis of the Pt/LBP showing the density distribution of Pt. Most of the Pt nanoparticles are deposited on the surface of SWNTs/CNFs network within the first layer by a coating process. FIG. 2(c) is a surface image of the first layer (SWNT/CNF mixture), showing a large amount of Pt nanoparticles deposited on the surface, while FIG. 2(d) is a surface image of the second layer (CNF), showing fewer Pt nanoparticles deposited on the surface.

The gradient catalyst structures of the anode and cathode catalyst layers 120 and 140 can also include a solid catalyst such as ionomers. Exemplary ionomers include perfluorinated sulfonic acid resin. The solid catalyst can be applied after the layered buckypaper with the plurality of catalyst nanoparticles is formed. The perfluorinated sulfonic acid resin can also be distributed with a concentration gradient along the thickness of the layered buckypaper. It has been determined that maintaining a proper catalyst and electrolyte loading ratio can be a key issue to achieving superior catalyst utilization. Accordingly, the first layer of the LBP can be rich in both catalyst nanoparticles and perfluorinated sulfonic acid resin and the second layer of the LBP can have lower concentrations of catalyst nanoparticles and perfluorinated sulfonic acid resin. Perfluorinated sulfonic acid resins useful in the MEAs disclosed herein include those sold by E.I. Du Pont De Nemours and Company under the NAFION mark, those sold by Dow Chemical under the DOW mark, those sold by Asahi Glass under the FLEMION mark, those sold by Asahi Chemical under the ACIPLEX mark, or any other suitable perfluorinated sulfonic acid resin substitute.

The MEA can include a proton exchange member 130, a gradient catalyst structure 120 and/or 140, and a gas diffusion layer (GDL) 150 and/or 160. The gradient catalyst structure (s) can include a plurality of catalyst nanoparticles disposed on layered buckypaper in which the layered buckypaper has at least a first layer and a second layer, the first layer can have a lower porosity than the second layer, and the MEA can have a catalyst utilization efficiency of at least 0.3 $g_{cat}$/kW or less. The gradient catalyst structure 120 and/or 140 can be oriented such that the first layer of the layered buckypaper 120 and/or 140 contacts the proton exchange membrane 130 and the second layer of the layered buckypaper contacts the gas diffusion layer 150 and/or 160.

The membrane electrode assembly can incorporate the gradient catalyst structure as the cathode, the anode, or both. Preferably, the MEA includes the gradient catalyst structure disclosed herein as at least a cathode layer.

Advantages of the gradient catalyst structure disclosed herein include: (1) the catalyst nanoparticles are located on the most accessible external surface of the layered buckypaper to maximize the catalyst utilization efficiency; (2) the pore size of the gradient catalyst structure generally range from meso- to macro-size, allowing effective coverage by perfluorinated sulfonic acid resin electrolytes, which facilitates the maximization of the three-phase boundary where the electrochemical reaction takes place; and (3) the well-connected porous nanomaterial network can ensure a pathway for mass and charge transfer. It has been unexpectedly discovered that the gradient catalyst structure with non-uniform, i.e., gradient, distribution of catalyst nanoparticles, porosity distribution and solid electrolyte, e.g., perfluorinated sulfonic acid resin, can greatly improve cell performance and catalyst utilization efficiency.

While not necessary for practicing the invention, it is believed that the aforementioned benefits result, at least in part, because at the interface between the first layer of the gradient catalyst structure of the catalyst layer(s) 120 and/or 140 and the proton exchange membrane 130, most of the catalyst nanoparticles are distributed close to the proton exchange membrane 130 resulting in a shortened migration path of proton for accessing the catalyst. A higher solid electrolyte, e.g., perfluorinated sulfonic acid resin, loading also increases the contact area between the electrolyte phases in the two media. The proton transport limitation of proton is thereby improved in both ways. Furthermore, at the interface between the second layer of the gradient catalyst layer 120 and/or 140 and the gas diffusion layer 150 and/or 160, respectively, larger pores and a lower solid electrolyte loading decrease the probability of a blockage of pores by the solid electrolyte. This facilitates gas diffusion and water removal through the gas diffusion layer 150 and/or 160. Another advantage is that the good chemical stability of the first layer, e.g., a CNT/CNF layer, can greatly enhance the electrode corrosion resistance, resulting in a more stable electrode.

An unexpected feature of the MEAs 110 disclosed herein is that they exhibit superior utilization of the catalyst disposed on the layered buckypaper of the gradient cathode and/or anode catalyst layer 140 and/or 120. Two measurements of catalyst efficiency of interest include (i) the surface area utilization efficiency, and (ii) the catalyst utilization efficiency. The surface area utilization efficiency of the catalyst nanoparticles of the catalyst layer disclosed can be at least 60%, or at least 65%, or at least 70%, or at least 75%, or at least 75%, at least 80%, or at least 85%. The catalyst utilization efficiency of the catalyst nanoparticles of the catalyst layer disclosed herein can be 0.50 gPt/kW or less, or 0.45 gPt/kW or less, or 0.40 gPt/kW or less, or 0.35 gPt/kW or less, or 0.30 gPt/kW or less, 0.25 gPt/kW, or 0.20 gPt/kW or less.

As used herein, the "catalyst utilization efficiency" is calculated as the quotient of the catalyst loading divided by the cell output power at 0.65 V in an MEA at a temperature of 80° C. with a back pressure of 20 psi for fuel and oxidant gases.

As used herein, the "surface area utilization efficiency" is calculated as the quotient of the electrochemical surface area (ECSA), as calculated by Formula (1), infra, divided by the real surface area, as calculated by Formula (2), infra. Formula (1) is the Scherrer formula, as shown below:

$$D \text{ (nm)} = \frac{0.9\lambda}{\beta_{1/2}\cos\theta} \quad (1)$$

where D is the mean size of the Pt particles, $\lambda$ is the X-ray wavelength (Cu K$\alpha$ line at $\lambda$=1.542 Å), $\beta_{1/2}$ is the half-peak width for Pt (111) in radians, and $\theta$ is the angle corresponding to the (111) peak. The real surface area of Pt can be calculated by assuming that all particles are in uniform spherical shape with the following equation:

$$SA = \frac{\text{surface area}}{\text{mass}} = \frac{\pi D^2}{\frac{1}{6}\pi D^3 \rho} = \frac{6}{\rho D} \quad (2)$$

where, $\rho$ is the mass density of Pt (21.4 g cm$^{-3}$) and D is the mean diameter of Pt particles in the catalyst.

The invention is also drawn to a method of fabricating a membrane electrode assembly for a fuel cell. The method can include producing a gradient catalyst structure by forming layered buckypaper and then depositing a plurality of catalyst nanoparticles on the layered buckypaper. The layered buckypaper can include at least a first layer and a second layer and the first layer can have a lower porosity than the second layer.

The layered buckypaper can include nanomaterials, such as SWNTs, MWNTs, CNFs or mixtures thereof. The first layer can include a mixture of small-size nanomaterials and large-size nanomaterials and the second layer can include large-size nanomaterials, as previously described. The plurality of catalyst nanoparticles can be deposited on the layered buckypaper using a variety of techniques including, but not limited to, electrochemical deposition, sputtering deposition, supercritical deposition and chemical reduction.

The gradient catalyst structure can be formed by depositing a plurality of catalyst nanoparticles on the layered buckypaper after the layered buckypaper has been formed. The layered buckypaper can be formed using less than 1 wt-% binder, such as TEFLON or NAFION, or less than 0.5 wt-%, or less than 0.25 wt-%, or less than 0.1 wt-%. By depositing the catalyst nanoparticles after the layered buckypaper is formed with minimal binder, the catalyst nanoparticles can be directly deposited at the most efficient sites directly on the layered buckypaper for maximizing the three-phase reaction coefficient. As used herein, "binder" is used to refer to compounds and compositions used to create adherence between the nanofilaments forming the buckypaper that are added during the formation of the buckypaper. Exemplary binders include perfluorinated polymers, such as those sold by E.I. Du Pont De Nemours and Company under the TEFLON mark, and perfluorinated sulfonic acid resins, such as those sold by E.I. Du Pont De Nemours and Company under the NAFION mark.

Once formed, the gradient catalyst structure can be incorporated into the membrane exchange assembly 110. For example, the anode catalyst layer 120, cathode catalyst layer 140, or both, can be pressed onto the proton exchange membrane 130. A solid electrolyte, such as NAFION, can be applied to the gradient catalyst structure(s) 120 and 140 and/or the proton exchange membrane 130 prior to or after combining the components into the membrane exchange assembly 110. When applied to the gradient catalyst structure(s) 120 and/or 140 following formation of the layered buckypaper, the solid electrolyte, e.g., a perfluorinated sulfonic acid resin, serves to enhance proton conductivity from the catalyst nanoparticles of the anode catalyst layer 120 through the proton exchange membrane 130 to the cathode catalyst layer 140. Unexpectedly, the incorporation of the solid electrolyte at this point in the process enables substantially higher surface area utilization efficiency (% utilization) and catalyst utilization efficiency ($g_{cat}$/kW).

EXAMPLES

Example 1

An exemplary gradient catalyst structure was prepared by filtrating a 25 wt-% SWNT/75 wt-% CNF suspension and CNF suspension sequentially under full vacuum. As shown in FIG. 2(a), the CNFs entangle randomly forming a highly porous second layer with a porosity of 90.8% and an average pore size of 85 nm, while smaller pores are formed in the SWNT/CNF layer by adding 25 wt. % fine-sized SWNTs. As a result, the SWNT/CNF first layer has a much larger surface area (105 m$^2$/g) than that of the CNF layer (24 m$^2$/g) because of the high aspect ratio of SWNT. After depositing Pt on the layered buckypaper by electrochemical deposition, EDS analysis in FIG. 2(b) showed a gradient distribution of Pt, with over 70% of the Pt distributed in the 7-micron-thick SWNT/CNF first layer. As shown in FIGS. 2(c) and 2(d), a large amount of Pt deposited on the surface of the SWNT/CNF first layer while fewer Pt nanoparticles deposited an the surface of the CNF second layer. Thus, FIG. 2 provides a qualitative and quantitative indication of how Pt is distributed inside the layered buckypaper because the Pt distribution is quite uniform within each layer. The pictures of surface morphology show that the Pt prefers to grow on the surface of SWNT instead of CNF. It is believed this is because SWNTs have a much higher surface area and more surface defects, resulting in more anchor sites for Pt nucleation. However, compared with chemical reduction methods for Pt deposition, electrochemical deposition resulted in relatively large Pt particles (average d: 5.4 nm) with obvious agglomeration.

Before being applied to the MEA, the Pt/LBP was impregnated with 5% Nafion solution under a vacuum followed by drying at 80° C. to introduce the proton conducting phase. Since the Nafion loading is estimated as ~0.2 g/cm$^3$ in the layered buckypaper and 0.29 g/cm$^3$ in a conventional single-layer SWNT/CNF (1:3 wt./wt.) buckypaper under the same preparing condition, it is believed that a gradient distribution of Nafion occurred along the buckypaper's thickness with more Nafion located in the SWNT/CNF layer due to the smaller pores, which facilitate the adsorption of Nafion solution by the effect of capillary force.

Figure 3:
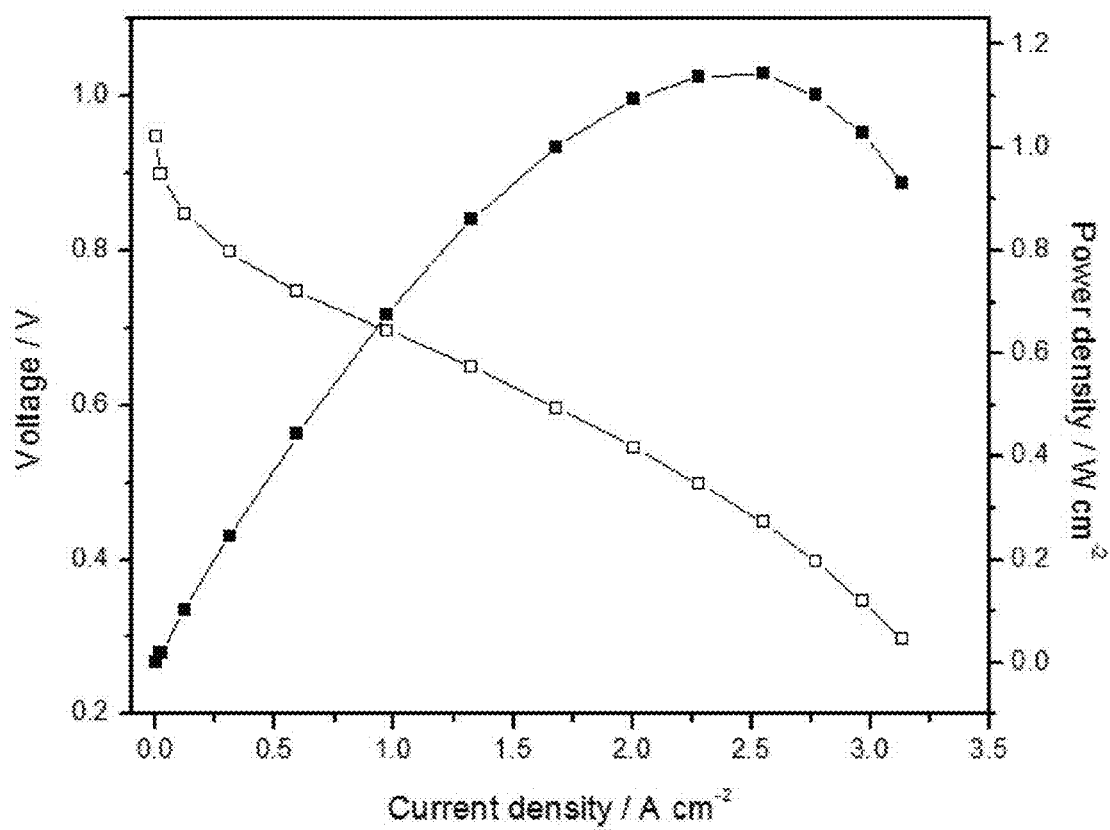
FIG. 3 is a cell polarization curve and power density as a function of current density for a MEA with an exemplary gradient catalyst structure as a cathode catalyst layer.

By applying the PT/LBP gradient catalyst structure disclosed herein as a cathode catalyst layer, an exemplary MEA exhibited excellent power performance with a relatively low Pt loading. As demonstrated in FIG. 3, the power performance and Pt loading can produce at least a rated power of 0.88 W/cm$^2$ (at 0.65 V) with a cathode Pt loading of 0.11 mg/cm$^2$. The total Pt utilization was 0.18 gPt/kW (cathode and anode), which approximates or exceeds the DOE's 2015 targets.

Example 2

The Pt/LBP with tailored gradient structure has demonstrated promising Pt utilization and stability of supports in spite of relative large Pt particle size. Considering the negligible improvement of anodic oxygen reduction reaction (ORR) activity by using Pt/LBP, such high cell performance is believed to result from the inventive microstructure of the gradient catalyst structure. To evaluate the effect of the microstructure on the fuel cell performance, two conventional single-layer buckypaper MEAs were compared in terms of their polarization curve and electrochemical impedance (EIS). The conventional buckypapers consist of the mixture of SWNT and CNF in a weight ratio of 1:3 (described as SF13) or 1:9 (described as SF19) with a thickness of 14 μm. Pt was deposited on each of the conventional buckypapers and the Pt/LBP layered buckypaper under the same conditions, consequently each had nearly the same catalyst nanoparticle size. Nafion was impregnated on the conventional buckypapers and the Pt/LBP layered buckypaper under the same conditions; however, Nafion loading varied because of the differences in pore structure of the buckypapers.

Figure 4A:
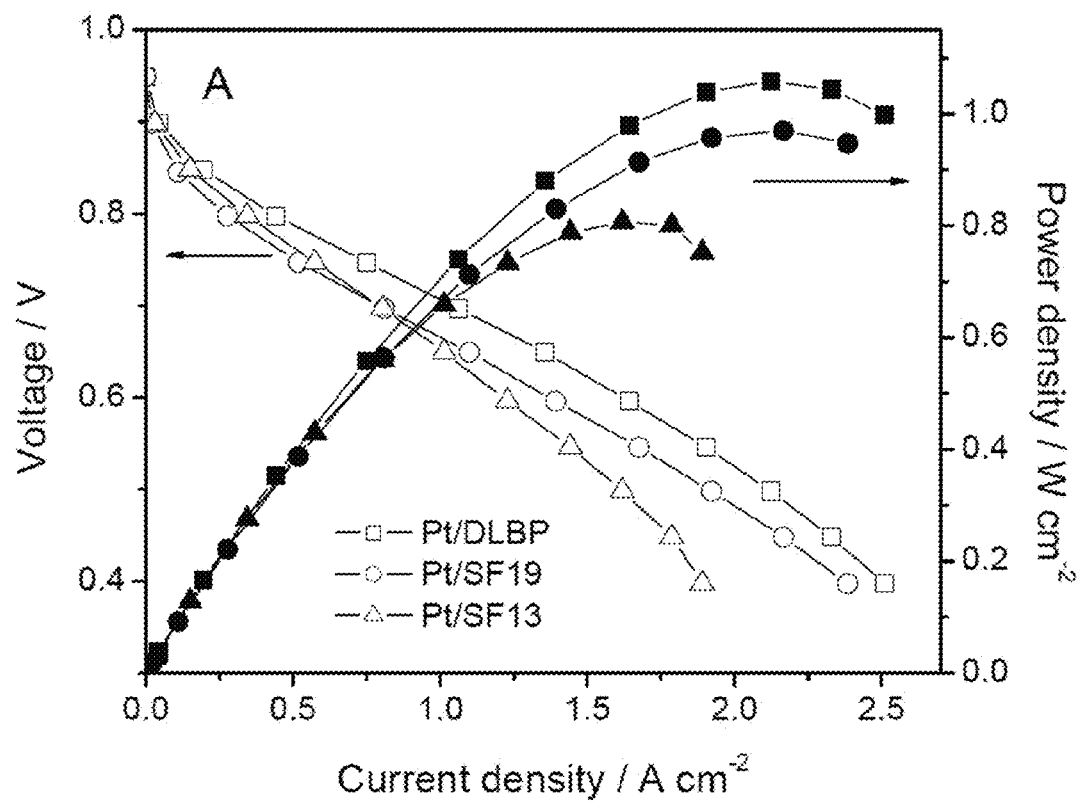
FIG. 4(a) is a cell polarization curve and power density as a function of current density for an MEA with an exemplary gradient catalyst structure and cell polarization curves and power density as a function of current density for two conventional MEAs.

As shown in FIG. 4(a), the mass transport limitation in the polarization curve of the SF13-based MEA was found more significant at the intermediate current region (>0.5 A/cm$^2$). FIG. 4(c) shows an impedance are occurring at the low-frequency region in the spectrum of the SF13-based MEA, indicating a pronounced gas diffusion resistance, which is due to the blockage of pores by Nafion which restricts oxygen transportation and water removal. The same mass transport limitation was not found in the Pt/LBP-based MEA, even though blockage of pores may have occurred in the SWNT/CNF first layer of the layered buckypaper. This is explained by the highly porous CNF second layer where the large pores are not easily blocked by the Nafion, which facilitates the gas diffusion and water removal.

Figure 4B:
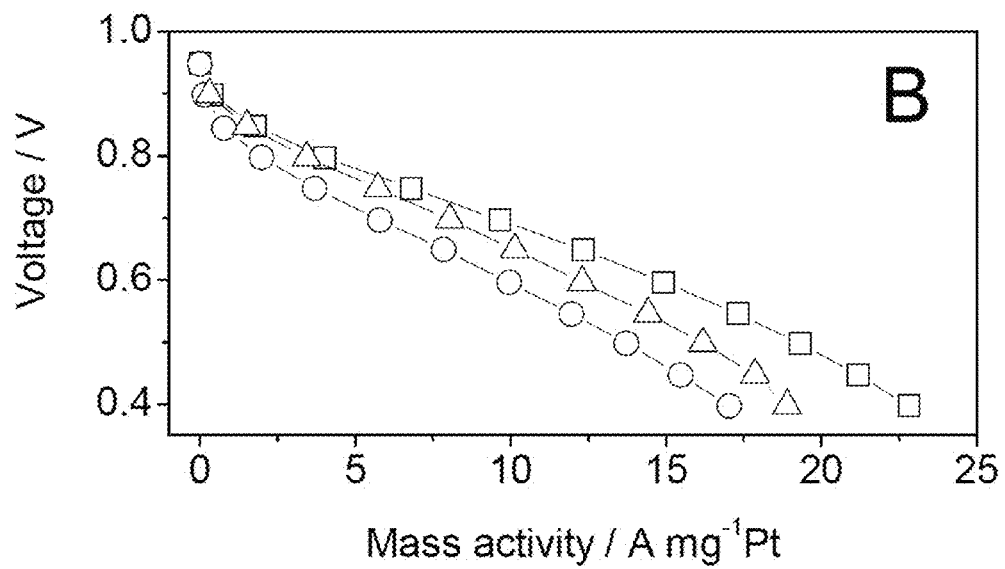
FIG. 4(b) is a graph of the voltage versus mass activity for the MEAs of FIG. 4(a).
Figure 4C:
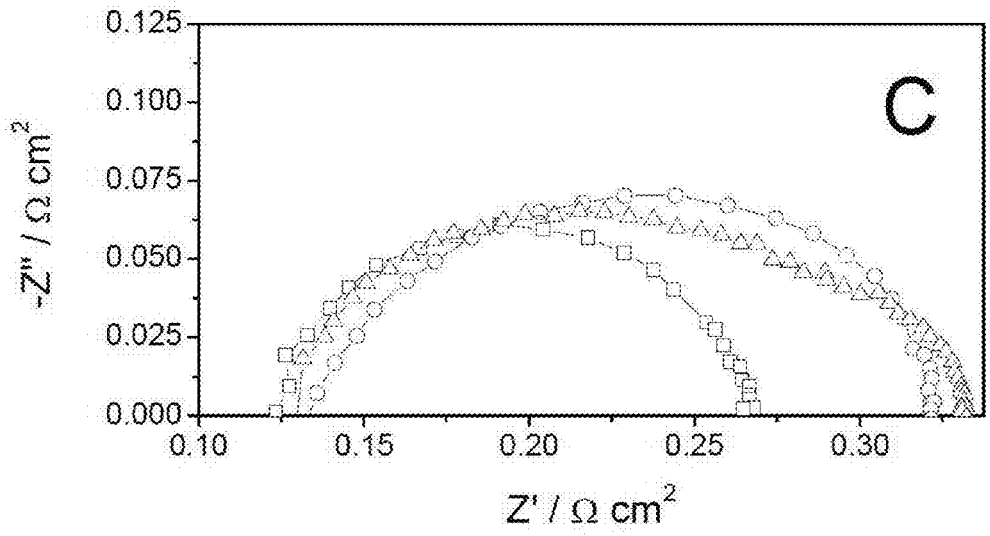
FIG. 4(c) is electrochemical impedance spectroscopy (EIS) data for the MEAs of FIG. 4(a).

As shown in FIG. 4(b), among the three catalyst structures, Pt/LBP showed the lowest charge transfer resistance ($R_{CT}$) and mass activity at high overpotential, which means that the most active sites per unit for ORR (interface between Pt and percolated ionomer) were created. The gradient distribution of catalyst nanoparticles contribute to the relatively high mass activity in Pt/LBP, since most of the catalyst nanoparticles are disposed on the thin SWNT/CNF first layer of the layered buckypaper, which is proximate or contacting the proton exchange membrane. This greatly reduces the possibility of the catalyst nanoparticles being out of reach by the protons (ionic resistance). Therefore, the transport limitations of protons and reactants in the Pt/LBP catalyst structure are unexpectedly improved by the inventive microstructure with functional grading of porosity, catalyst concentration and electrolyte density resulting in remarkable catalyst efficiency.

Example 3

Figure 5:
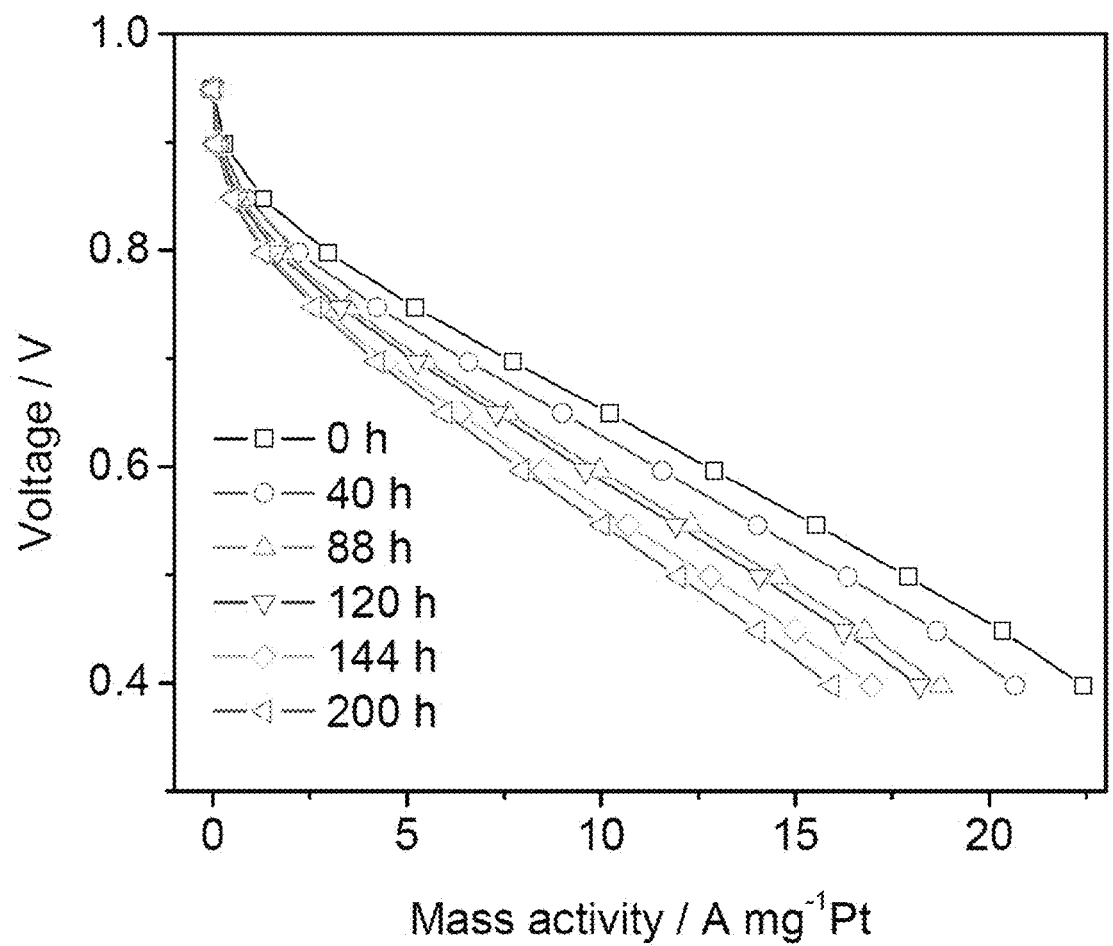
FIG. 5 is a graph of polarization curves at different operation times for a fuel cell with an exemplary MEA.

In W. Zhu et al., *Durability Study on SWNT/Nanofiber Buckypaper Catalyst Support for PEMFCs*, Journal of the Electrochemical Society (2009), a SWNT/CNF buckypaper with Pt catalyst nanoparticles demonstrated good durability under an accelerated degradation test in a simulated PEM fuel cell cathode environment. The good durability is believed to be due to the high corrosion resistance resulting from the high degree of graphitization of the CNFs. Subsequently, the durability of catalyst support for the Pt/LBP-based MEA disclosed herein was evaluated per DOE's test protocol set forth in U.S. Dept. of Energy, *Hydrogen, Fuel Cell & Infrastructure Technologies Program Multi-Year Research, Development and Demonstration Plan* (2007). FIG. 5 shows the polarization curves at different time intervals during the 200-hour durability test. The mass activity measured at 900 mV lost only 57.6% of initial activity after 200 hours of operation, which is much better than that obtained in conventional Pt/C (90% loss of initial activity) and approaches the DOE's 2015 target (≤60% loss of initial activity). This result indicates the gradient catalyst structure is a good potential candidate for the catalyst support to achieve a highly stable electrode with exceptional catalyst efficiency.

Example 4

Preparation and Characterization of Layered Buckypaper

LBP

SWNTs 0.8-1.2 nm in diameter and 100-1000 nm in length were purchased from Carbon Nanotechnologies Inc. CNFs 100-200 nm in diameter and 30-100 µm in length from Applied Sciences Inc. were produced using a chemical vapor deposition (CVD) method followed by a high-temperature treatment at 3,000° C. All materials were used as received without further purification.

The layered buckypaper was produced using a vacuum filtration method. Typically, a ten-milligram mixture of SWNTs and CNFs (wt./wt. 1:3) in 500 mL N,N-Dimethylformamide (Aldrich) was sonicated for 30 minutes to achieve a homogenous suspension. A suspension containing only 10 mg CNFs was also prepared. The SWNT/CNF and CNF suspensions were then filtered sequentially through a nylon membrane (Millipore, 0.45 µm in pore size) under a vacuum. After drying, a thin film layer was peeled from the filter membrane to produce a layered buckypaper with a first SWNT/CNF layer and a second CNF layer. Single-layer buckypapers were also prepared in the same way by filtrating only one type of suspension. Surface analyses were performed on the single-layer buckypaper. A Tristar 3000 (Micrometritics) was used to characterize the Brunauer-Emmett-Teller (BET) surface areas by using a nitrogen adsorption method. Mercury intrusion porosimetry was performed by Micromeritics Corp. using an AutoPore 9520 system to determine the pore size distribution.

Preparation and Characterization of Pt/LBP

Pt nanoparticles were deposited onto the layered buckypaper using a pulse electrodeposition technique from a mixture solution of 10 mM $H_2PtCl_6$, 0.1 M $H_2SO_4$, and 0.5 M ethylene glycol with $N_2$ bubbling. The blank buckypaper working electrode was loaded on a house-made sample holder coupled with a hydrophobic carbon fiber paper as a current collector. A saturated calomel electrode (SCE) was used as the reference electrode and Pt gauze as the counter electrode. The electrodeposited size of the buckypaper was 5 $cm^2$ and the buckypaper laid on the window size of the sample holder exposed to the electrolyte. The applied potential increased from 0.3 V to −0.35 V (vs. SCE) with a pulse width of 4 seconds and a pulse duty cycle of 25%. The pulse was repeated until the desired Pt loading was reached. Pt loading was determined by weighing the mass difference before and after the deposition.

Figure 6A:
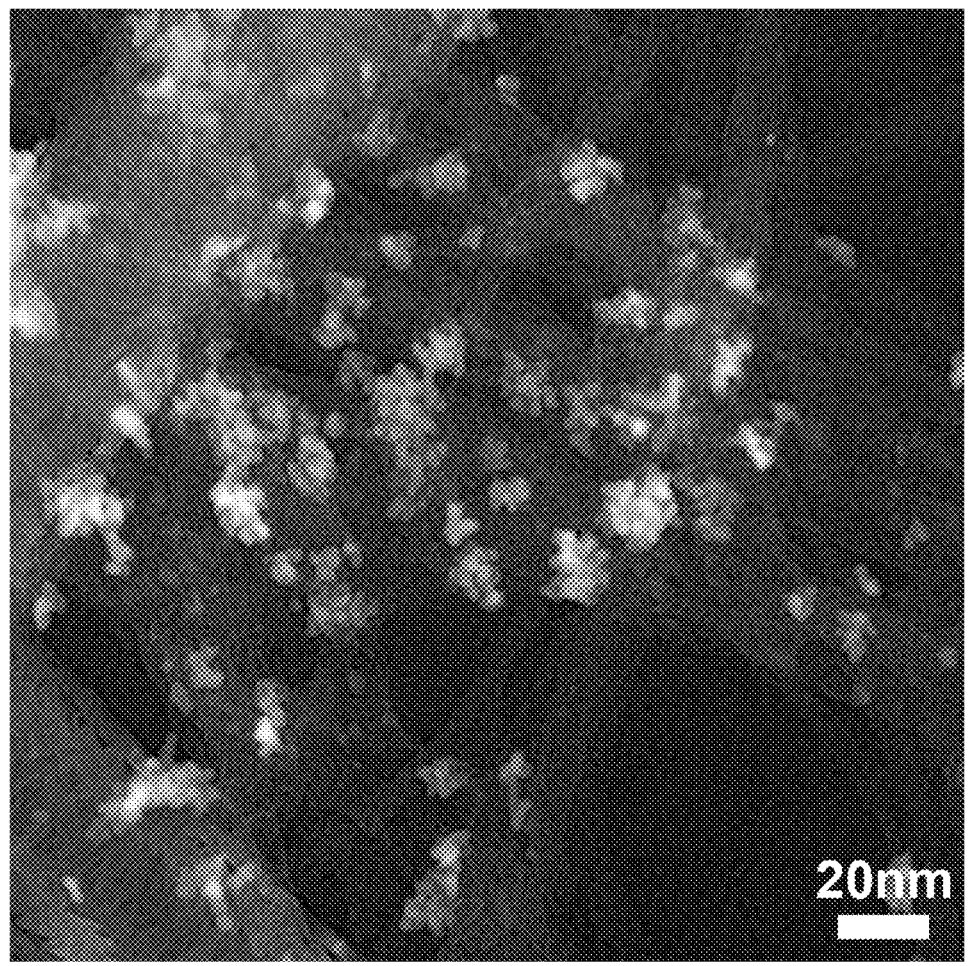
FIG. 6(a) is a transmission electron microscopy (TEM) image of an exemplary layered buckypaper.
Figure 6B:
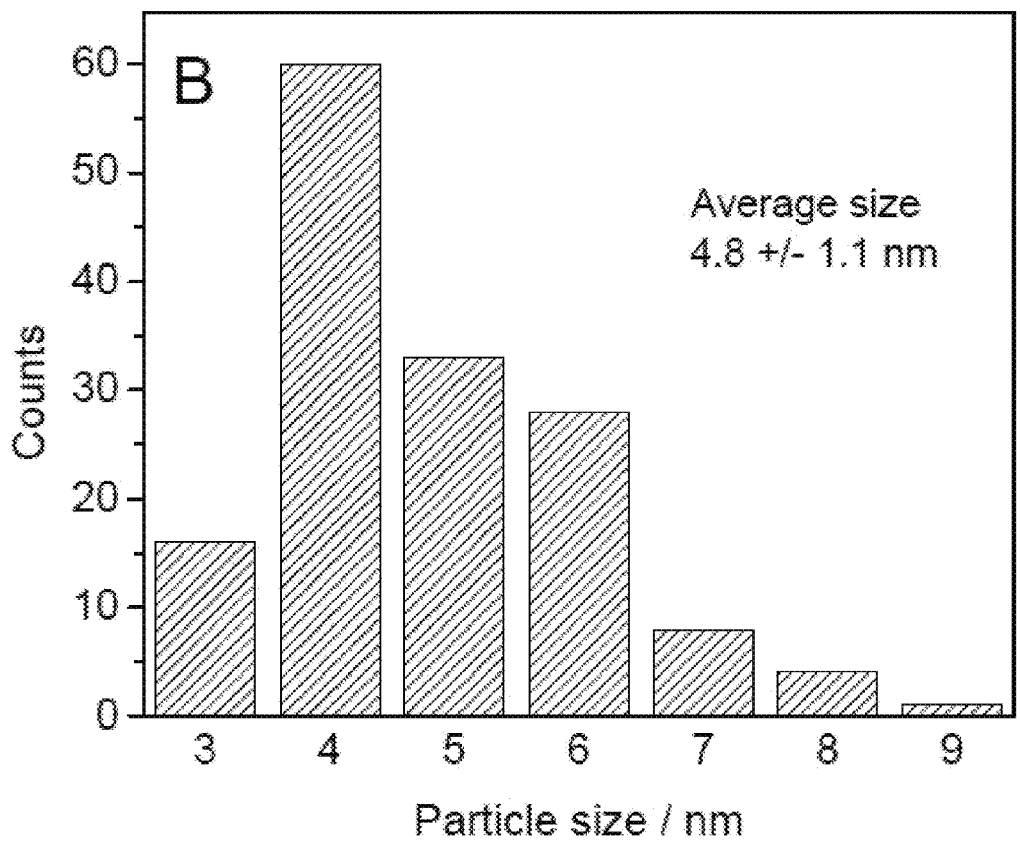
FIG. 6(b) is a Pt particle size distribution for the exemplary layered buckypaper of FIG. 6(a).

The surface and cross-section morphology of the Pt/LBP was characterized using a scanning electron microscope (SEM, JEOL JSM 7401F). The cross-section sample was prepared by a triple ion-beam miller (Leica EM TIC020). The elemental mapping of platinum was performed on the cross-section of Pt/LBP by an energy-dispersive X-ray spectrometer (EDS) attached to the JSM 7401F microscope. The detailed morphologies of Pt were characterized using a transmission electron microscope (TEM, JEM-2010, JEOL). FIG. 6(*a*) shows a TEM image of the Pt/LBP. FIG. 6(*b*) shows the Pt size distributions, which were obtained from the TEM image by analyzing 150 randomly selected Pt particles.

The electrochemical surface area of Pt/LBP catalysts was characterized by using cyclic voltammetry (CV) in a three-electrode/one-compartment cell. To prepare the working electrode, a piece of Pt/LBP was stuck to the top of a glassy carbon (GC) electrode (0.196 $cm^2$) by using a drop of 0.5% Nafion solution. The electrolyte solution was 0.5 M $H_2SO_4$, which was thoroughly deaerated by bubbling $N_2$ gas for 30 minutes. A $N_2$ atmosphere was maintained over the solution during the test. The potential ranged from −0.25 V to +1.1 V (vs. SCE) at a scan rate of 50 mV/s. Oxygen reduction reaction (ORR) activities of Pt/LBP were measured by a rotating disk electrode (RDE) in $O_2$-saturated 0.1 M $HClO_4$ at room temperature. The linear voltammograms were recorded in the range of 0-0.75 V (vs. SCE) at a scan rate of 10 mV/s with the rotation speed between 400 and 1600 rpm.

Fabrication and Characterization of Membrane Electrode Assembly (MEA)

A two-layer structure was used as the gas diffusion layer at both cathode and anode sides. The outer layer was teflonized (30 wt % Teflon in cathode, 10 wt. % in anode) carbon paper (TGPH-090, Toray). The inner layer (between the carbon paper and catalyst layer) was prepared by spraying an iso-propanol mixture of the carbon black (Vulcan XC-72, Cabot) and a 30 wt. % or 10 wt % Teflon emulsion (Aldrich) onto the carbon paper, which was then sintered at 340° C. for 1 hour. An anode catalyst layer was prepared by a conventional ink process. The proper amount of the Pt/C catalyst (20% Pt on Vulcan XC-72, E-Tek) was mixed with 10 wt. % Nafion in iso-propanol and then air-sprayed on the inter GDL to constitute the anode catalyst layer with a Pt loading of 0.05 $mg/cm^2$. A thin layer of Nafion solution (0.5 $mg/cm^2$) was then sprayed onto the surface of the anode catalyst layer. Pt/LBP was impregnated with 5% Nafion solution (Aldrich) under a vacuum. After drying at 80° C., the Pt/LBP was placed on the cathode GDL to serve as a catalyst layer where the selected side of the layered buckypaper, i.e., the SWNT/CNF layer, was exposed. The membrane electrode assembly was finally formed by sandwiching the electrolyte membrane (Nafion 212, Dupont) between the anode and cathode and hot-pressing them at 130° C. for 3 minutes under 30 $kg/cm^2$ of pressure. The MEA was operated by a fuel cell testing system (Fuel Cell Technologies) with humidified $H_2$ gas as the fuel and humidified $O_2$ gas as the oxidant. The fuel cell temperature was 80° C., the $H_2/O_2$ humidifier temperatures were 80/80° C. and the back pressures were 20 psi on both sides of the fuel cell. The flow rates were set at a stoichiometric level of 2 for hydrogen and 3 for oxygen. The cell performance was recorded by electronic load assembled in the testing system. The electrochemical impedance spectra for the cathodic reactions were measured using a Solartron 1280B electrochemical workstation (Solartron) in the frequency range from 0.1 Hz to 10 kHz in galvanostatic mode. The anode was used as the reference electrode.

Durability Test of Catalyst Support

The accelerated stress test of Pt/LBP was performed in an MEA at 95° C. with feeding hydrogen and nitrogen in the anode and cathode respectively. The relative humidity (RH) of $O_2$ oxidant gas and $H_2$ fuel gas was set to 80% and back pressures were kept at 20 psi on both sides of the fuel cell. The fuel cell voltage was held at 1.2 V for 200 hours by using a potentiostat (Solartron 1280B). The polarization curves were recorded every 24 hours at 80° C. per the DOE protocol described previously.

Electrochemical Characterization of Pt/LBP

Figure 7A:
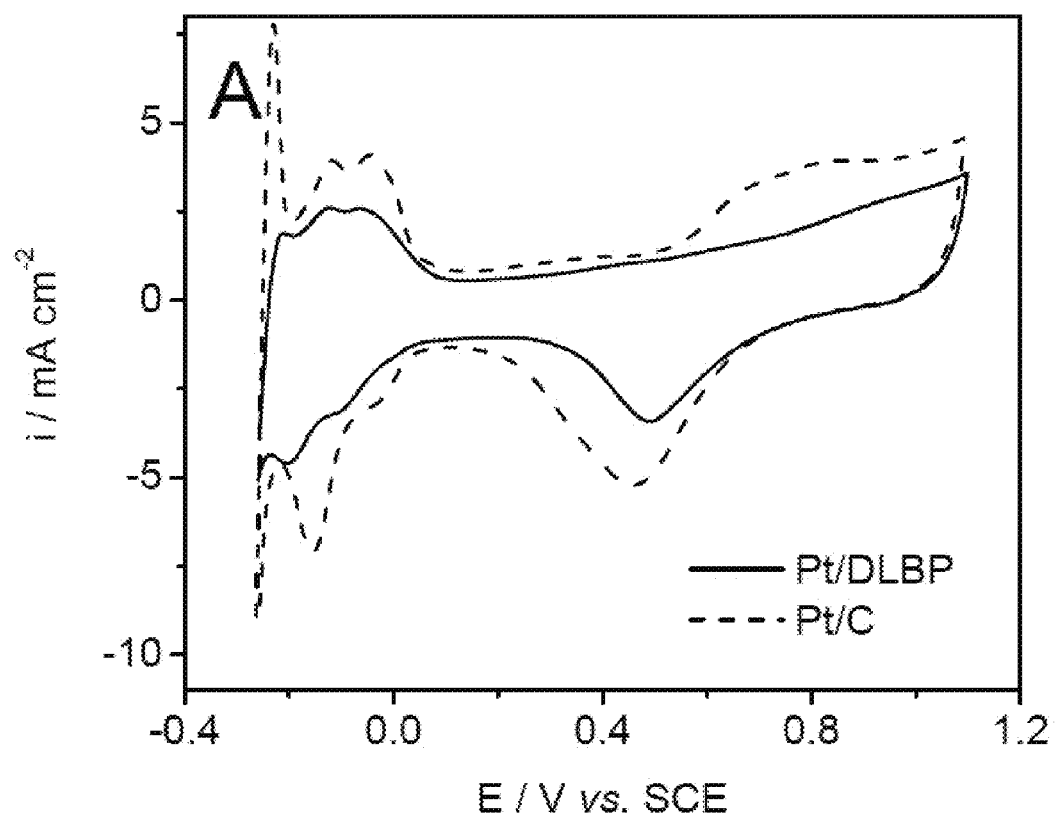
FIGS. 7(a) and 7(b) are graphs of electrochemical characteristics of an exemplary MEA and a conventional MEA.
Figure 7B:
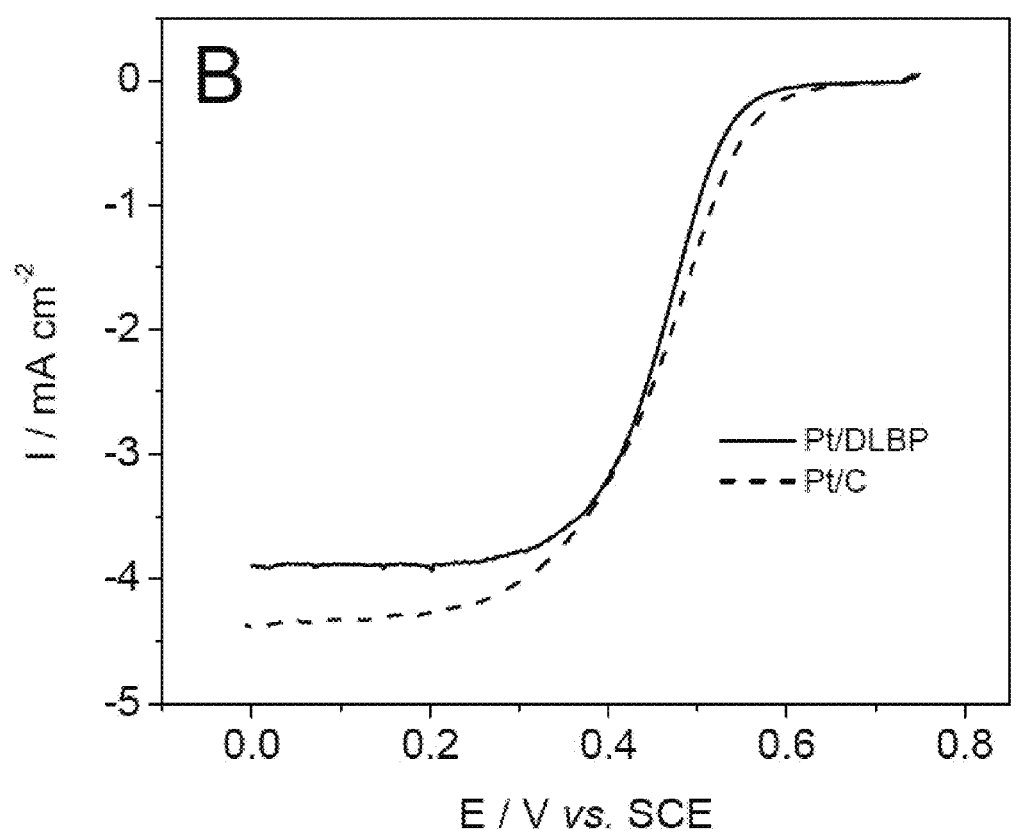

The electrochemical surface area (ECSA) of Pt/LBP was obtained by the integration of the $H_2$-adsorption peak in the hydrogen region (−0.2 to 0.15 V vs. SCE) of the cyclic voltammogram, as shown in FIG. 7(a), with subtraction of the current due to double layer charging. The calculated ECSA for the Pt/LBP electrocatalyst was 56.0 $m^2/g$ which is less than that achieved in the commercial PVC (70.1 $m^2/g$) due to the relatively large Pt particles in the Pt/LBP compared with the average Pt size of 2.2 nm in Pt/C. Accordingly, FIG. 7(b) shows the RDE measurement, with a smaller limit current for the Pt/LBP catalyst than the Pt/C catalyst, indicating less catalytic activity towards ORR. However, the catalyst utilization in the Pt/LBP electrode was relatively high considering the large Pt particle size.

Impedance Analysis

Figure 8A:
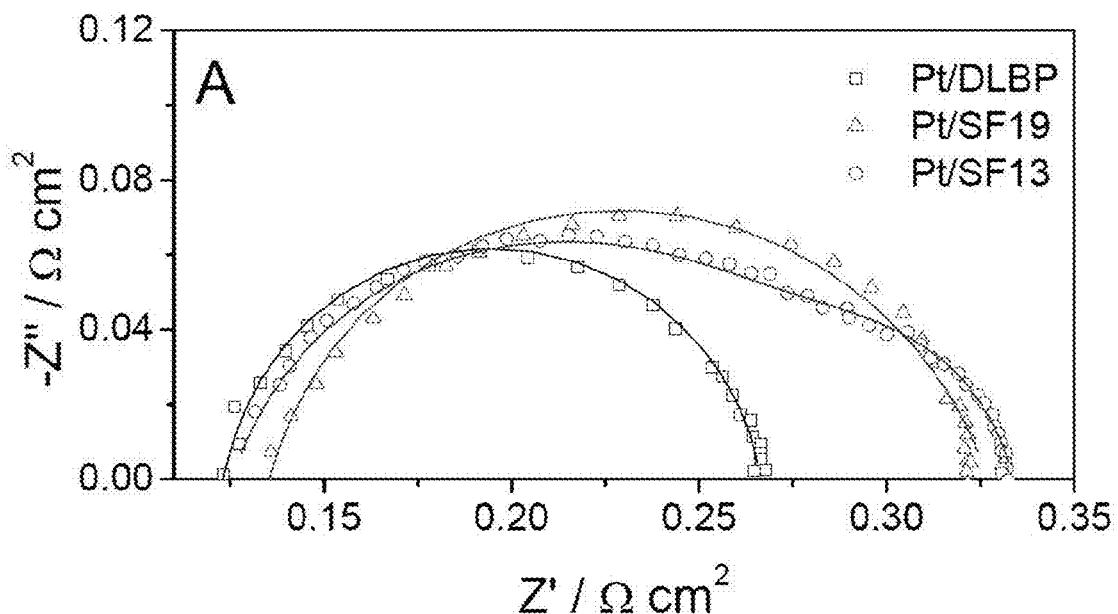
FIG. 8(a) is electrochemical impedance spectroscopy (EIS) data for an MEA with an exemplary gradient catalyst structure and two conventional MEAs.
Figure 8B:
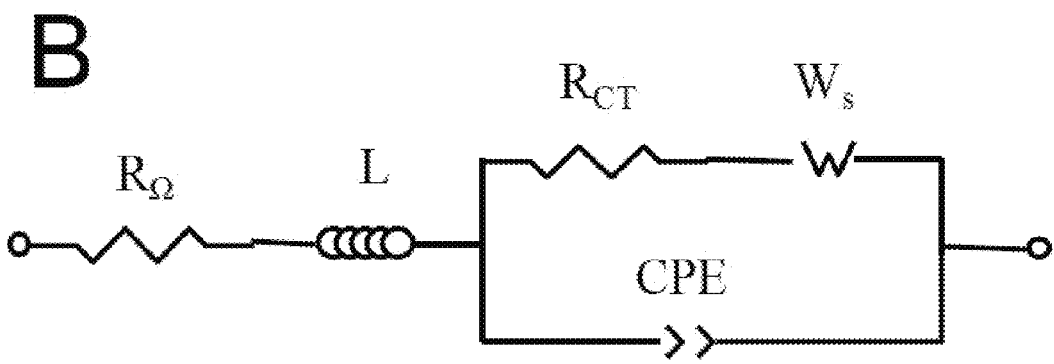
FIG. 8(b) is a modified Randles-Ershler equivalent circuit model for the EIS data of FIG. 8(a).

The impedance spectra were quantitatively analyzed based on a complex nonlinear least-squares fitting (CNLS) of experimental data to a modified Randles-Ershler equivalent circuit model by employing a fitting program (Z-plot for Windows, Scribner Associates). The equivalent circuit model is shown in FIG. 8(b), where $R_\Omega$ represents the ohmic resistance, $R_{CT}$ represents the charge-transfer resistance, and $W_S$ represents the finite-length Warburg impedance. The conventional double layer capacitance is replaced by a constant phase element (CPE) to account for non-homogeneous electrode. L is the pseudo-inductance associated with the effects produced by the collector plates, leading wire, and other metallic components of cell test kits. The finite-length Warburg impedance is expressed as $$Z_W(\omega) = Z_W(0)[\tan h(js)^{1/2}/(js)^{1/2}], \quad (3)$$

Where $s = l^2(\omega/D)$, $j = (-1)^{1/2}$ and l and D are the diffusion length and coefficient, respectively. $Z_W(0)$ is the mass-transport resistance, which is the value of $Z_W(\omega)$ when $\omega \to 0$. FIG. 8(a) shows the measuring EIS data for Pt/LBP-, Pt/SF13- and Pt/SF19-based MEAs presented by symbols and the fitting data presented by solid lines.

The charge-transfer resistances RCT obtained from the fitting process are 0.15 $\Omega cm^2$, 0.19 $\Omega cm^2$, and 0.21 $\Omega cm^2$ for Pt/LBP, Pt/SF13, and Pt/SF19 electrode, respectively. The mass-transport resistances in Pt/LBP and Pt/SF19 are negligible ($<10^{-9}$ $\Omega cm^2$) due to the existence of large pores. On the contrary, the mass-transport resistance is 0.039 $\Omega cm^2$ for the SF13 catalyst support since the relatively small pores and high ionomer loading results in a difficulty of oxygen diffusion.

The foregoing description of preferred embodiments of the invention has been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A membrane electrode assembly (MEA) for a fuel cell comprising:
   a proton exchange membrane; and
   a gradient catalyst structure comprising a plurality of catalyst nanoparticles disposed on layered buckypaper,
   wherein, along a direction perpendicular to the surface of the layered buckypaper, the gradient catalyst structure exhibits one selected from the group consisting of: a non-uniform pore size distribution, a non-uniform porosity, a non-uniform catalyst nanoparticle distribution, and combinations thereof,
   wherein the layered buckypaper comprises at least a first layer and a second layer,
   wherein the first layer has a lower porosity than the second layer, and wherein a first weight percentage of the plurality of catalyst nanoparticles is disposed on the first layer and a second weight percentage of the plurality of catalyst nanoparticles is disposed on the second layer, wherein the first weight percentage is at least 5 wt-% more than the second weight percentage,
   wherein the first layer comprises a mixture of:
   (i) at least one of single-walled carbon nanotubes, small diameter multi-wall nanotubes, or both; and
   (ii) carbon nanofibers and large diameter multi-wall nanotubes; and
      wherein the second layer comprises carbon nanofibers and large diameter multi-wall nanotubes,
      wherein the small diameter multi-wall nanotubes have a diameter of less than 10 nm, and
      wherein the large diameter multi-wall nanotubes have a diameter of greater than 10 nm.

2. The membrane electrode assembly according to claim 1, wherein a catalyst utilization efficiency of said plurality of catalyst nanoparticles is $\leq 0.35$ $g_{cat}/kW$.

3. The membrane electrode assembly according to claim 1, wherein the first layer has a porosity at least 5 percentage points lower than the porosity of the second layer.

4. The membrane electrode assembly according to claim 1, wherein the plurality of catalyst nanoparticles comprise an element selected from the group consisting of platinum, iron, nitrogen, nickel, carbon, cobalt, copper, palladium, ruthenium, rhodium and combinations thereof.

5. The membrane electrode assembly according to claim 1, wherein the gradient catalyst structure further comprises perfluorinated sulfonic acid resins.

6. The membrane electrode assembly according to claim 1, wherein the gradient catalyst structure is a cathode catalyst layer.

7. A proton exchange membrane fuel cell comprising:
   the membrane exchange assembly of claim 1, wherein the gradient catalyst structure is a cathode catalyst layer; and
   an anode catalyst layer;
   wherein the proton exchange membrane is provided between the cathode catalyst layer and the anode catalyst layer.

8. The proton exchange membrane fuel cell according to claim 7, wherein a catalyst utilization efficiency of said plurality of catalyst nanoparticles is ≤0.35 $g_{cat}$/kW.

9. The proton exchange membrane fuel cell according to claim 7, wherein the first layer of the layered buckypaper has a porosity at least 5 percentage points lower than the porosity of the second layer of the layered buckypaper.

10. The proton exchange membrane fuel cell according to claim 7, wherein the gradient catalyst structure is formed by depositing the plurality of catalyst nanoparticles on the layered buckypaper after the layered buckypaper has been formed.

11. The proton exchange membrane fuel cell according to claim 7, wherein the catalyst layer further comprises a perfluorinated sulfonic acid resin, wherein the perfluorinated sulfonic acid resins is applied after the layered buckypaper has been formed.

12. The proton exchange membrane fuel cell according to claim 7, further comprising a cathode gas diffusion layer, wherein the cathode catalyst layer is oriented such that the first layer of the layered buckypaper contacts the proton exchange membrane and the second layer of the layered buckypaper contacts the cathode gas diffusion layer.

* * * * *

UNITED STATES PATENT AND TRADEMARK OFFICE
CERTIFICATE OF CORRECTION

PATENT NO. : 8,703,355 B2  Page 1 of 1
APPLICATION NO. : 12/839124
DATED : April 22, 2014
INVENTOR(S) : Jiang-ping Zheng It is certified that error appears in the above-identified patent and that said Letters Patent is hereby corrected as shown below:

Title page, item [75]

Delete "Chun Zhang, Wei Zhu, Jiang-ping Zheng, Zhiyong Liang, and Ben Wang" and insert -- Jiang-ping Zheng, Zhiyong Liang, Ben Wang, Chun Zhang, and Wei Zhu --

Signed and Sealed this
Seventh Day of October, 2014

Michelle K. Lee
*Deputy Director of the United States Patent and Trademark Office*